(12) United States Patent
Han (10) Patent No.: US 8,793,285 B2
(45) Date of Patent: Jul. 29, 2014

(54) MULTIDIMENSIONAL TAGS

(75) Inventor: Qiang Han, Ashtown (IE)

(73) Assignee: Business Objects Software Ltd., Dublin (IE)

( * ) Notice: Subject to any disclaimer, the term of this patent is extended or adjusted under 35 U.S.C. 154(b) by 282 days.

(21) Appl. No.: 12/885,589

(22) Filed: Sep. 20, 2010

(65) Prior Publication Data

US 2012/0072435 A1 Mar. 22, 2012

(51) Int. Cl.
*G06F 7/00* (2006.01)
*G06F 17/30* (2006.01)

(52) U.S. Cl.
USPC ........................................................ 707/803

(58) Field of Classification Search
USPC ......... 707/705, 722, 732, 736, 737, 754, 756, 707/999.3, 802, 803
See application file for complete search history.

(56) References Cited

U.S. PATENT DOCUMENTS

| | | | |
|---|---|---|---|
| 7,386,535 B1 * | 6/2008 | Kalucha et al. ........ | 707/999.002 |
| 2008/0027967 A1 * | 1/2008 | Garbow et al. .............. | 707/102 |
| 2008/0114778 A1 * | 5/2008 | Siegel ........................... | 707/100 |
| 2009/0077025 A1 * | 3/2009 | Brooks et al. ..................... | 707/3 |
| 2009/0100078 A1 * | 4/2009 | Lai et al. ....................... | 707/100 |
| 2009/0132935 A1 * | 5/2009 | Van Zwol ..................... | 715/756 |
| 2009/0174247 A1 * | 7/2009 | Grable .......................... | 297/366 |
| 2010/0250532 A1 * | 9/2010 | Soroushian et al. .......... | 707/736 |
| 2011/0015996 A1 * | 1/2011 | Kassoway et al. ......... | 705/14.49 |
| 2011/0267360 A1 * | 11/2011 | Lee et al. ..................... | 345/522 |

OTHER PUBLICATIONS

Chaudhuri, S. and Dayal, U.; An overview of data warehousing and OLAP technology; ACM SIGMOD Record ; vol. 26 , Issue 1, pp. 65-74; ACM New York, NY, USA; 1997 (http://portal.acm.org/citation.cfm?id=248603.248616).

Golder, Scott A., Huberman, Bernardo A.; The Structure of Collaborative Tagging Systems; Information Dynamics Lab, HP Labs; 2005 (http://www.hpl.hp.com/research/idl/papers/tags/tags.pdf).

Linton C. Freeman; The Development of Social Network Analysis: A Study in the Sociology of Science; Empirical Press, Vancouver, CA; 2004; ISBN: 1594577145.

Martin Halvey and Mark T. Keane; An Assessment of Tag Presentation Techniques; Proceedings of the 16th international conference on World Wide Web, Banff, Alberta, Canada, pp. 1313-1314; ACM New York, NY, USA; 2007 (http://portal.acm.org/citation.cfm?id=1242826).

Kaser, O. and Lemire, D.; Tag-Cloud Drawing: Algorithms for Cloud Visualization; in WWW Workshop on Tagging and Metadata for Social Information Organization, Banff, Canada; 2007 (www2007.org/workshops/paper_12.pdf).

(Continued)

*Primary Examiner* — Hares Jami (57) ABSTRACT

Various embodiments of systems and methods for generating multidimensional tags to analyze tagged contents are described herein. One or more predetermined tag dimensions and one or more predetermined measures associated with web content are recorded when at least one tag core is defined. The predetermined tag dimensions provide quantitative metrics describing how the tagged content has evolved. For example, time at which tagged content is consumed, user groups consuming the tagged content, and the like. The predetermined measures provide quantitative metrics describing how the tagged content is consumed such as through browsing, downloading, and the like. The tag core, the recorded predetermined tag dimensions and the recorded predetermined measures are assembled to generate a multidimensional tag. Further, the multidimensional tag is updated by recording latest one or more tag predetermined dimensions and one or more predetermined measures when the web content associated with the multidimensional tag is consumed.

14 Claims, 7 Drawing Sheets

(56) References Cited

OTHER PUBLICATIONS

Roy T. Fielding; Architectural styles and the design of network-based software architectures; Ph.D. Dissertation, University of California, Irvine; 2000 (http://www.ics.uci.edu/~fielding/pubs/dissertation/fielding_dissertation.pdf).

Voss, Jakob; Tagging, Folksonomy & Co—Renaissance of Manual Indexing?; Proceedings of the 10th International Symposium for Information Science (Cologne, Germany), pp. 234-254; arXiv—Cornell University, Ithaca, NY, USA; 2007 (http://arxiv.org/PS_cache/cs/pdf/0701/0701072v2.pdf).

Kevin McDonald, Andreas Wilmsmeier, David C. Dixon, W. H. Inmon, Mastering the SAP Business Information Warehouse: Leveraging the Business Intelligence Capabilities of SAP NetWeaver, 2nd Edition, ISBN: 978-0/7645-9637-7.

Sanjay Sood, Sara Owsley, Kristian Hammond and Larry Birnbaum; TagAssist: Automatic Tag Suggestion for Blog Posts; Proceedings of International Conference on Weblogs and Social Media 2007 (Colorado, USA); ICWSM, Colorado, USA (2007); (http://www.icwsm.org/papers/2--Sood-Owsley-Hammond-Birnbaum.pdf).

Zhichen Xu, Yun Fu, Jianchang Mao and Difu Su; Towards the Semantic Web: Collaborative Tag Suggestions; Proceedings of Collaborative Web Tagging Workshop at 15th International World Wide Web Conference (Edinburgh, Scotland); University of Southampton, Southampton, UK; 2006 (http://www.semanticmetadata.net/hosted/taggingws-www2006-files/13.pdf).

\* cited by examiner

MULTIDIMENSIONAL TAGS

FIELD

Embodiments generally relate to computer systems, and more particularly to methods and systems for generating multidimensional tags to analyze tagged contents.

BACKGROUND

The expansion of Internet and World Wide Web (commonly known as web) has given users the enhanced ability to read, listen, and watch different forms of web content. However, due to significant increase in the amount of web content, retrieving relevant web content has become a challenge. Therefore, the concept of tagging has been introduced to classify and search relevant web content. Tagging refers to a process of assigning a tag to the web content. The tag is a keyword or term assigned to the web content by a user and/or a web content owner. Usage of tags allows users to classify web contents they use, and later systems use the tags to search relevant web content, which interests other users. In other words, tags are widely reorganized as keywords used to describe the web content.

Currently, there are different methods used to define tags. One of the methods includes defining the tag by the user when the web content is consumed, using the user's own vocabulary. In another method, the tag is defined by the web content owner by drawing words from a controlled vocabulary. In yet another method, the tag defined by the web content owner gives an option to the user to re-tag the tag. However, the methods described above have one or more of the following drawbacks during analysis of the relevant web content. First, as the tag defined by the user lacks control over terminology, there are chances of meta-noise. Second, even though the tag defined by the web content owner includes well-understood terms, the tag may become obsolete over time. Also, the tag defined by the web content owner and later re-tagged by the user may combine the strengths from the above mentioned methods, while also inheriting the drawbacks. Therefore, search results, as retrieved by the system through analyzing the tags and as defined by the above mentioned methods, may not be precise.

Further, the web content often evolves independently of the tag that is associated with it. Therefore, information describing how the tagged content changes is not known. Also, the current system falls short by failing to identify popular tags from which the web content is consumed the most. Therefore, obliterating ineffective tags, unused tags or meta-noise associated with the web content is not achieved.

In general, though tagging is considered as the prevailing tool for personalizing, classifying and searching heterogeneous web content, systems often find it hard to analyze tags and the associated web content for various analytic purposes. Therefore, analyzing the tagged content, i.e., how the web content evolved and has been consumed along with the change in associated tags would be desirable to the systems to classify and identify the relevant web content.

SUMMARY

Various embodiments of systems and methods for generating multidimensional tags to analyze tagged contents are described herein. One or more predetermined tag dimensions and one or more predetermined measures associated with web content are recorded when at least one tag core is defined. The predetermined tag dimensions provide quantitative metrics describing how the tagged content has evolved. For example, time at which tagged content is consumed, user groups consuming the tagged content, location at which the tagged content is consumed, and the like. The predetermined measures provide quantitative metrics describing how the tagged content is consumed such as through browsing, downloading, and the like. The tag core, the recorded tag dimensions and the recorded measures are assembled to generate a multidimensional tag. Further, the multidimensional tag is updated by recording latest one or more predetermined tag dimensions and one or more predetermined measures when the web content associated with the multidimensional tag is consumed. Hence, by analyzing the multidimensional tag, the web content associated with the multidimensional tag can be analyzed, i.e., how the web content has evolved and been consumed along with the change in associated tag core.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for methods and systems for generating multidimensional tags to analyze tagged contents are described herein. A tag includes a tag core, i.e., a semantic label for identifying web content. Web content includes any information that is published or distributed in a digital form, such as or a combination of a text, an audio, a video, an image, a software application (e.g., games, time zone converters, etc.) and the like. Tagged content includes the web content defined by the tag core. According to one embodiment, a multidimensional tag consists of two composite parts, the tag core and one or more predetermined tag dimensions. The predetermined tag dimensions provide quantitative metrics describing how the tagged content has evolved. One or more parameters of the predetermined tag dimensions include 'time', 'location', 'user group', 'age groups' and the like. For example, time at which tagged content is consumed, user groups consuming the tagged content, location at which the tagged content is consumed and the like are recorded through the one or more predetermined tag dimensions.

The tag dimensions are further associated with corresponding predetermined measures to provide quantitative metrics describing how the tagged contents are consumed. One or more parameters of the predetermined measures include 'traffic' (e.g., number of browsing hits, number of downloads, and the like), 'sharing' (e.g., to whom the tagged content is shared, and the like), 'changing' (e.g., updating, deleting and the like) and the like. Further, the measures and the associated tag dimensions are stored in a tag fact table. The tag fact table helps in providing valuable analytic scopes for a system to discover the potential insights of the tagged content easily. For example, analytic scopes include 'number of downloads (measure) performed at a particular time (tag dimension)', 'number of browsing hits (measure) occurred at a particular location (tag dimension)', and the like with respect to the associated tag core.

In one embodiment, the predetermined tag dimensions and the predetermined measures are recorded when the tag core is defined. The multidimensional tag is generated by assembling the tag core with the recorded predetermined tag dimensions and the predetermined measures. Further, the multidimensional tag is updated by recording latest predetermined tag dimensions and measures, when the web content associated with the multidimensional tag is consumed. Furthermore, the multidimensional tag is analyzed to provide relevant search results in which the user is interested in. In general, multidimensional tag provides a standard structured way of monitoring and analyzing the tagged contents from which, the system can easily identify the most relevant and popular tag which helps to organize, classify and search heterogeneous web contents. The multidimensional tags intend to enhance usage of tags by determining how the tagged content associated with the tag core is evolved and consumed.

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
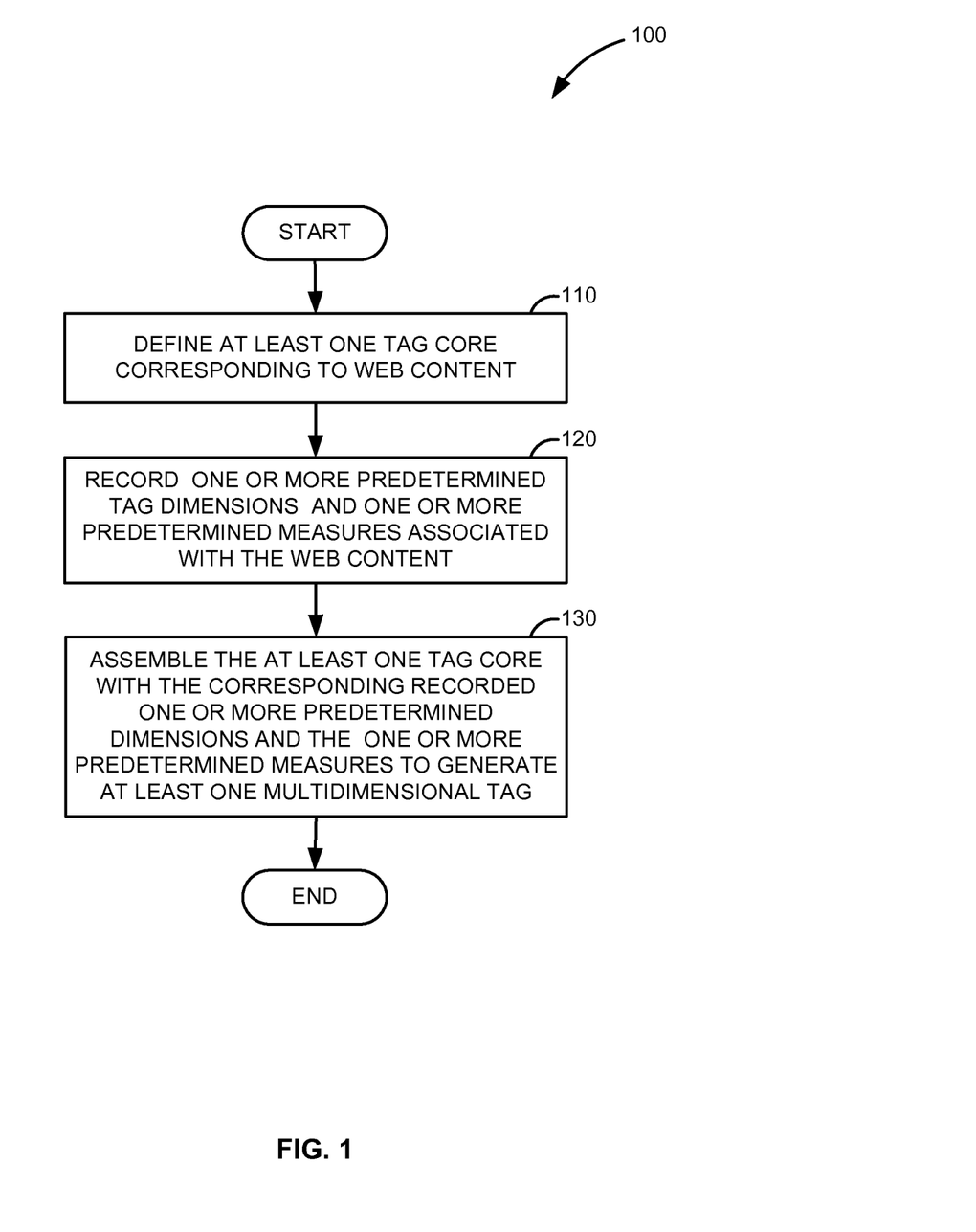
FIG. 1 is a flow diagram illustrating a process for generating at least one multidimensional tag, according to an embodiment.

FIG. 1 is a flow diagram illustrating a process 100 for generating at least one multidimensional tag, according to an embodiment. At step 110, at least one tag core corresponding to web content is defined. The tag core includes an effective semantic label for identifying the web content. For example, the web content containing 'platform for server programming in a Java programming language' is tagged by the tag core 'J2EE'. The tag core can be defined by a user or a web content owner. At step 120, one or more predetermined tag dimensions and one or more predetermined measures associated with the web content are recorded. The predetermined tag dimensions and the predetermined measures include parameters of metrics describing the evolution and consumption of the tagged content.

In one embodiment, the evolution of the web content associated with the tag core is recorded by the predetermined tag dimensions. For example, the time at which the tagged content is consumed, location at which the tagged content is consumed, and the like are recorded by the predetermined tag dimensions. The tag dimensions can include predetermined parameters such as 'time', 'location', 'user group', 'age groups', 'format', and the like to capture the evolution of the web content associated with the tag core. In one embodiment, hierarchies can be introduced to describe the tag dimensions. For example, 'location' includes geography, country, and region at different levels to capture the location where the tag is defined, changed and consumed, i.e., to understand how the tagged content is accessed geographically. 'Time' includes year, month, week, and date at different levels to describe when the tag is defined, changed and consumed. 'User groups' or 'culture groups' capture how the web content is consumed based on social differences. 'Format' captures most popular format in which the web content is consumed. Similarly, 'domain' captures the domain such as finance, marketing, accounting, and the like to identify business scopes of the web content.

In one embodiment, the consumption of the web content associated with the tag core is recorded by the predetermined measures. In other words, the predetermined measures record the state of the tagged content. For example, the measures provide how the web content is consumed by the users through measurements such as browsing, downloading, streaming, and the like. The predetermined measures can include 'traffic' to monitor any actions occurring to the web content such as number of browsing hits, number of downloads and the like; 'sharing' to monitor sharing activities occurring to the web content such as to whom the web content is shared, what permission is given and the like; and 'changing' to monitor changes to the web content such as updating, deleting, tagging, and the like. In one embodiment, the parameters of the tag dimensions and the measures are predetermined based on a plurality of analytic objectives such as to analyze number of downloads (measures) from a location (tag dimension), number of browsing hits (measures) at a time (tag dimension) and the like depending on user's interest.

At step 130, the at least one multidimensional tag is generated by assembling the at least one tag core with the corresponding recorded one or more predetermined tag dimensions and the one or more predetermined measures. The framework of the multidimensional tag is described in greater detail in FIG. 2. Also, the multidimensional tags can be generated for previously created tags, when the web content associated with the tags is consumed, by recording corresponding predetermined tag dimensions and the predetermined measures. In one embodiment, the measures and the associated tag dimensions are stored in a predetermined structured format in a tag fact table, which makes analyzing the content of the multidimensional tags easier. The tag fact table is described in greater detail in FIG. 5.

Figure 2:
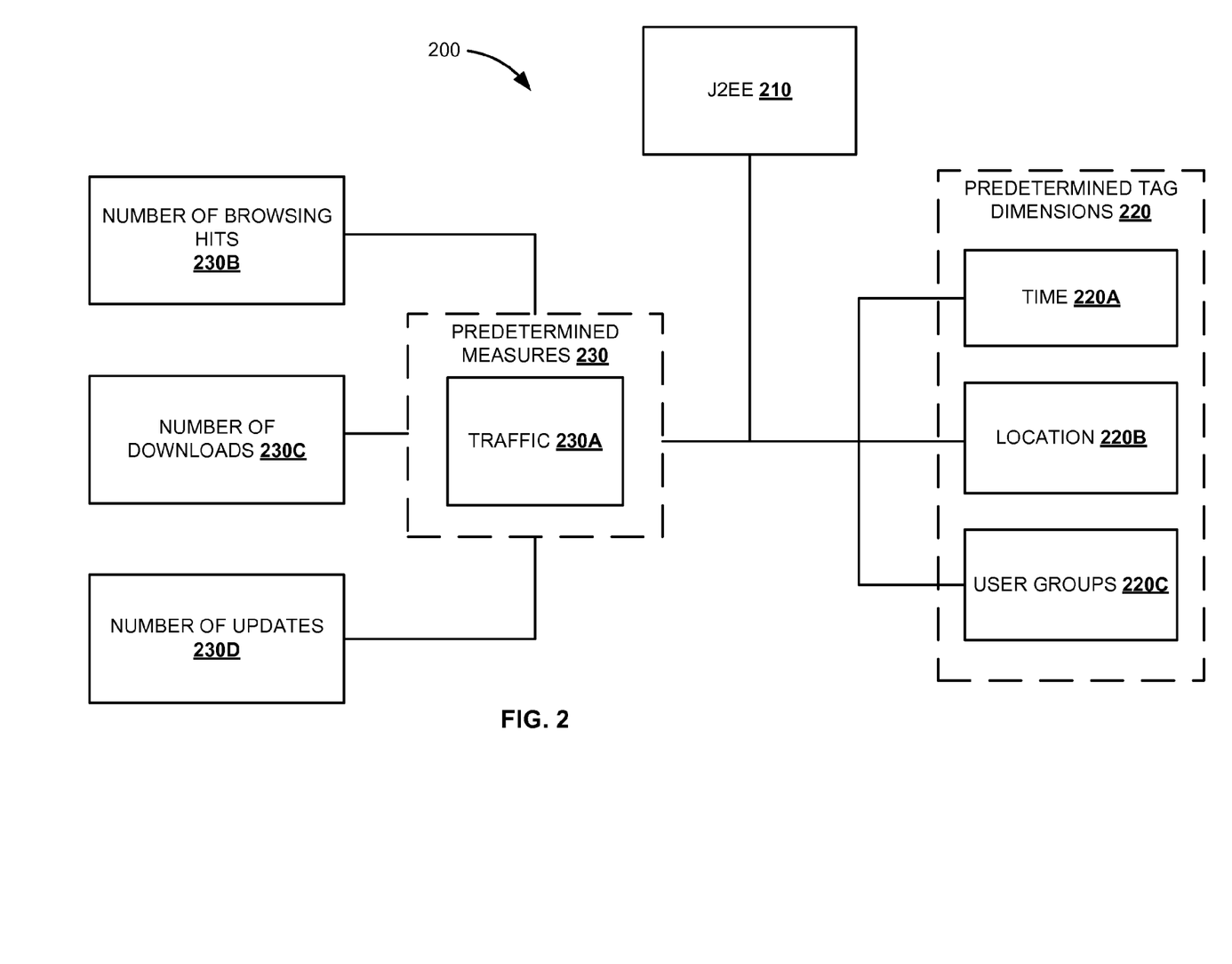
FIG. 2 is a schematic diagram of an exemplary multidimensional tag framework, according to an embodiment.

FIG. 2 is a schematic diagram of a multidimensional tag framework 200, according to an embodiment. A multidimensional tag 200 includes two composite parts, a tag core (e.g., 'J2EE' 210) and one or more predetermined tag dimensions 220. 'J2EE' 210 is a semantic label for identifying web content. In one embodiment, the parameters of the tag dimensions 220 such as 'time' 220A, 'location' 220B and 'user groups' 220C are predetermined. Further, the predetermined tag dimensions 220 are associated with one or more predetermined measures 230, wherein the predetermined measures 230 provide understanding of web content consumption. Parameter 'traffic' 230A is predetermined for the measures 230 to monitor any actions occurring to the web content, such as number of browsing hits 230B, number of downloads 230C, and number of updates 230D. In one embodiment, the predetermined measures 230 cannot be executed without the predetermined tag dimension 220, but not vice versa. Also, the predetermined measure 230 can belong to multiple predetermined tag dimensions 220. For example, the predetermined measure 230 to record how the web content is downloaded can belong to the predetermined tag dimensions 220 of 'time' 220A, 'location' 220B, and 'user groups' 220C. Further, each tag dimension may have multiple measures that collect different aspects of measurements but share the same tag dimension, such as 'time' 220A, 'location' 220B, and 'user groups' 220C.

In one embodiment, when the tag core, e.g., 'J2EE' 210 is defined, the time at which the web content is consumed ('time' 220A), location at which the web content is consumed ('location' 220B), and who is consuming the web content ('user group' 220C) are recorded. Further, number of browsing hits 230B at a particular time ('time' 220A), number of downloads 230C by a user group ('user group' 220C) and the like are recorded. In general, the predetermined tag dimensions 220 along with the predetermined measures 230 include parameters of metrics describing evolution and consumption of the tagged content associated with the tag core 'J2EE' 210. In one embodiment, assembling of the tag core 'J2EE' 210 with the recorded predetermined tag dimensions 220 and the recorded predetermined measures 230 forms the multidimensional tag 200. Further, the multidimensional tag 200 is updated when the web content is consumed using the tag core 'J2EE' 210 and is described in greater detail in FIG. 3. In one embodiment, the tag dimensions and the measures can always be configured to attach to the multidimensional tag whenever desired.

Figure 3:
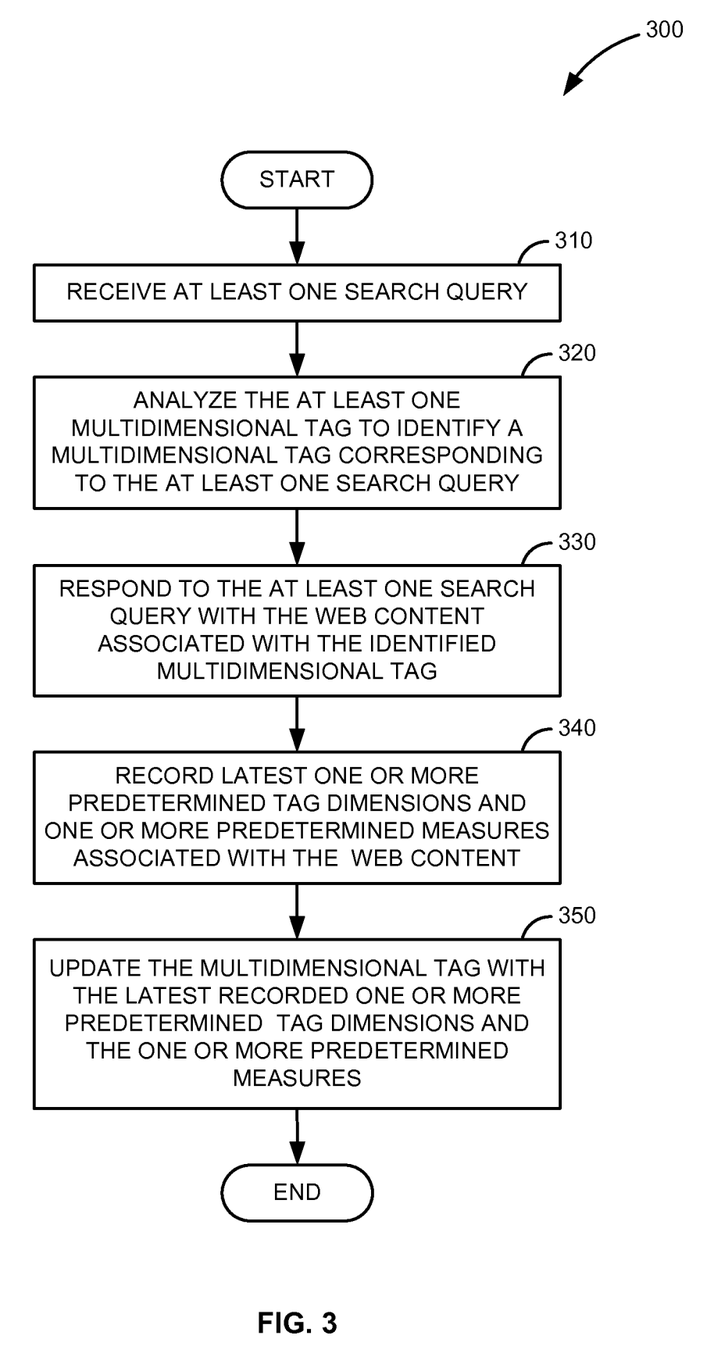
FIG. 3 is a flow diagram illustrating a process for updating the at least one multidimensional tag generated in FIG. 1, according to an embodiment.

FIG. 3 is a flow diagram illustrating a process 300 for updating the multidimensional tag which is generated in FIG. 1, according to an embodiment. At step 310, at least one search query initiated by a user is received. The search query refers to the information provided or inputted to the search engine to define the subject matter that the user is interested in searching. The user refers to an agent, a human, a computer or other mechanism or actor capable of providing the search query. At step 320, the at least one multidimensional tag as generated in FIG. 1 is analyzed to identify a multidimensional tag corresponding to the at least one search query. In one embodiment, analyzing the multidimensional tags includes filtering meta-noises by eliminating one or more ineffective multidimensional tags and identifying at least one effective multidimensional tag. For example, using the measure 'traffic' as an example, if the consumption of the web content is high through a particular tag core, then the multidimensional tag associated with the tag is considered as the more effective multidimensional tag. Also, effectiveness can be interpreted from different perspectives based on the tag dimensions. For example, within a given period, the most used tag for browsing; for a given user group, the most used tag for updating; and the like. For example, if the web content is tagged by two tag cores 'J2EE' and 'software' during analysis, both the multidimensional tags of the tag cores 'J2EE' and 'software' are analyzed to identify the most popular tag in a particular time period, by a user group, in a particular location and the like, which help to obliterate ineffective tags.

At step 330, the at least one search query is responded to with the web content associated with the identified multidimensional tag. The web content is presented to the users by displaying meta-tag of the web content and is described in greater detail in FIG. 6. The meta-tag is an index of the web content, which includes Hyper Text Markup Language (HTML) or Extensible Hyper Text Markup Language (XHTML) elements used to provide structured metadata about the web content.

At step 340, latest one or more predetermined tag dimensions and one or more predetermined measures associated with the web content of the identified multidimensional tag are recorded. Furthermore, the multidimensional tag is updated with the latest recorded predetermined tag dimensions and the predetermined measures in step 350. For example, considering the multidimensional tag 200 of FIG. 2 as an example, whenever the tagged web content is consumed by the user through the tag 'J2EE' 210, the tag dimensions 'time' 220A, 'location' 220B and 'user groups' 220C gets updated. Further, the measure 'traffic' 230A also gets updated by the information regarding consumption of the web content.

Figure 4:
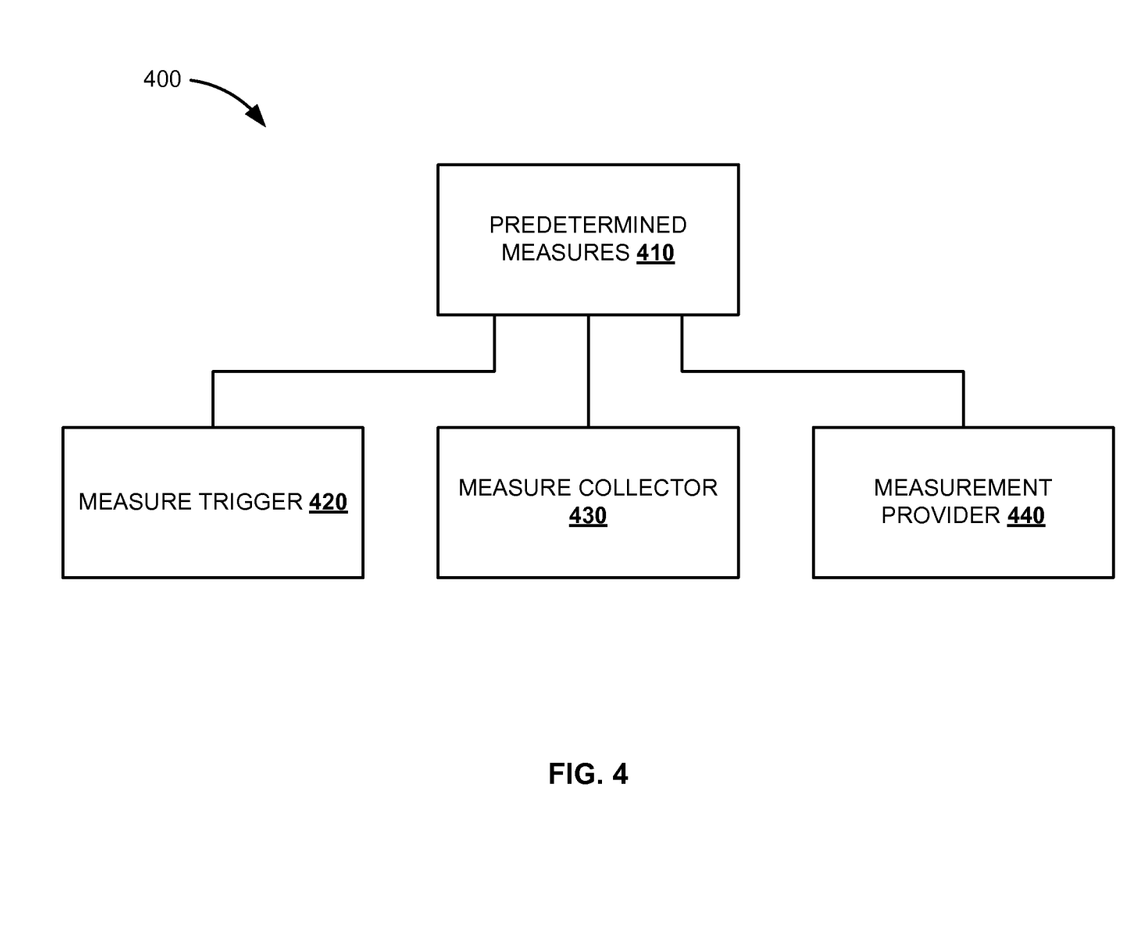
FIG. 4 is a block diagram illustrating a system for retrieving metrics of a measure, according to an embodiment.

FIG. 4 is a block diagram illustrating a system 400 for retrieving metrics of predetermined measures 410, according to an embodiment. In one embodiment, system 400 includes a measure trigger 420, a measure collector 430 and a measurement provider 440. The measure trigger 420 defines the conditions on which the measures 410 will be executed. The measure collector 430 includes a set of methods that are invoked by the measure trigger 420. The methods interpret web content related transactions to extract and/or compute the defined measurements or metric, such as number of browsing hits, downloads updates and the like for the predetermined measures 410. The measurement provider 440 includes a set of properties that quantify characteristics related to change in the web content as recorded by the measure collector 430.

In operation, the measure trigger 420 triggers the measure collector 430 to record one or more predetermined measures 410. Further, the measurement provider 440 quantifies characteristics related to change in the web content as recorded by the measure collector 430. For example, the measure trigger 420 triggers whenever the web content is consumed, the web content becomes either expired or deleted, the web content is updated and the like. In other words, the measure trigger 420 triggers when the state of the web content is changed and/or consumed such as browsing, downloading, updating and the like. The recorded measures are stored in a predetermined structured format in a tag fact table, which is described in greater detail in FIG. 5.

Figure 5:
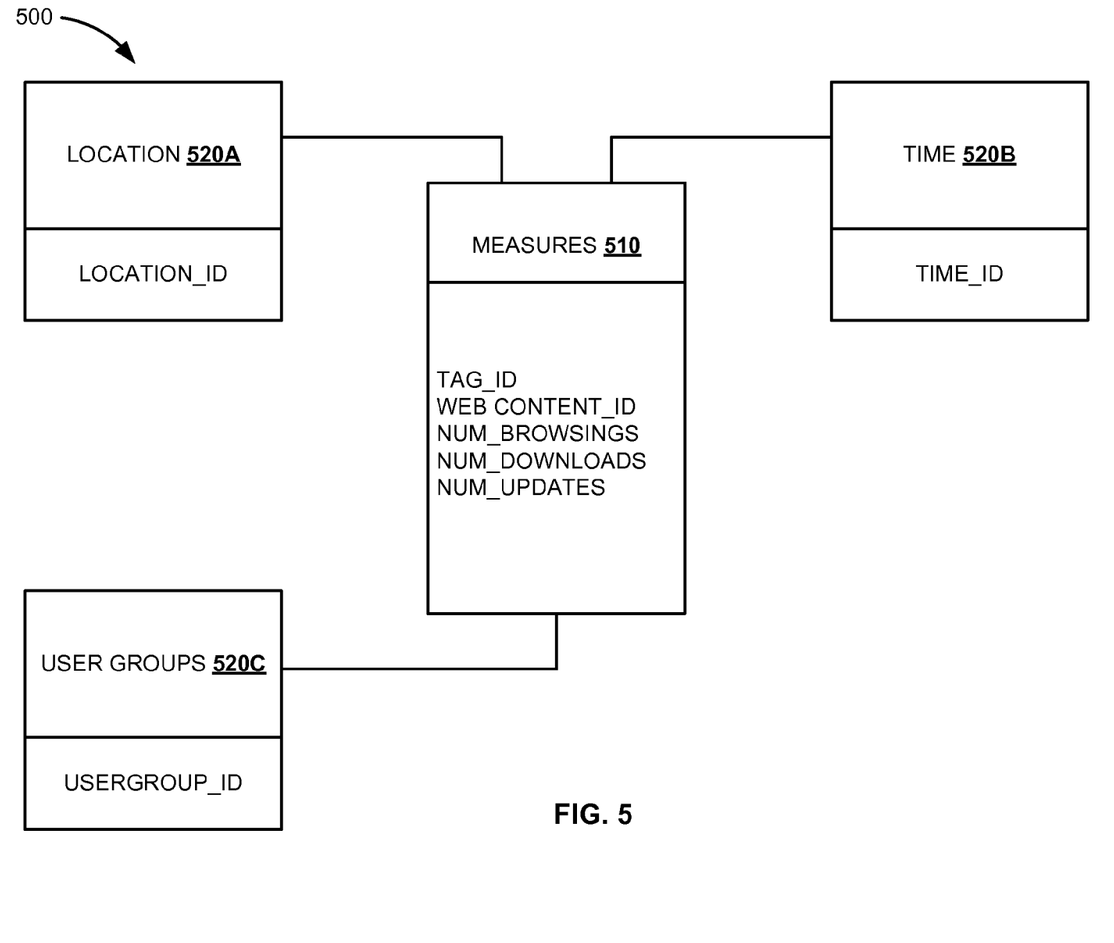
FIG. 5 is a schematic diagram of an exemplary tag fact table, according to an embodiment.

FIG. 5 is a schematic diagram 500 of an exemplary tag fact table 510, according to an embodiment. The recorded measures as described in FIG. 4 are stored in a predetermined structured format (e.g., start-schema format, having one tag fact table 510 and one or more tag dimensions 520A to 520C) in the tag fact table 510. One or more measures as in 510 such as number of browsing hits, number of downloads, number of updates and the like and associated tag dimensions such as 'location' 520A, 'time' 520B and 'user groups' 520C will form the analytic schema to support the required analytic functionality. Also, if multiple measures share the same tag dimensions, the tag fact table consolidates the similar measurements recorded from multiple measures.

In another embodiment, the tag fact table can be built using the traditional data warehouse extract, transform, and load (ETL) approach. The metrics of the measures can be collected from various sources such as auditing log, data transaction tables, etc. In one embodiment, building tag fact tables captures not only changes of tagged content, but also records how tags are evolving together with the tagged contents. Further, once tag fact tables are built, tools such as the conventional BI analytic tools can be applied to display search results to the user as described in FIG. 6.

Figure 6:
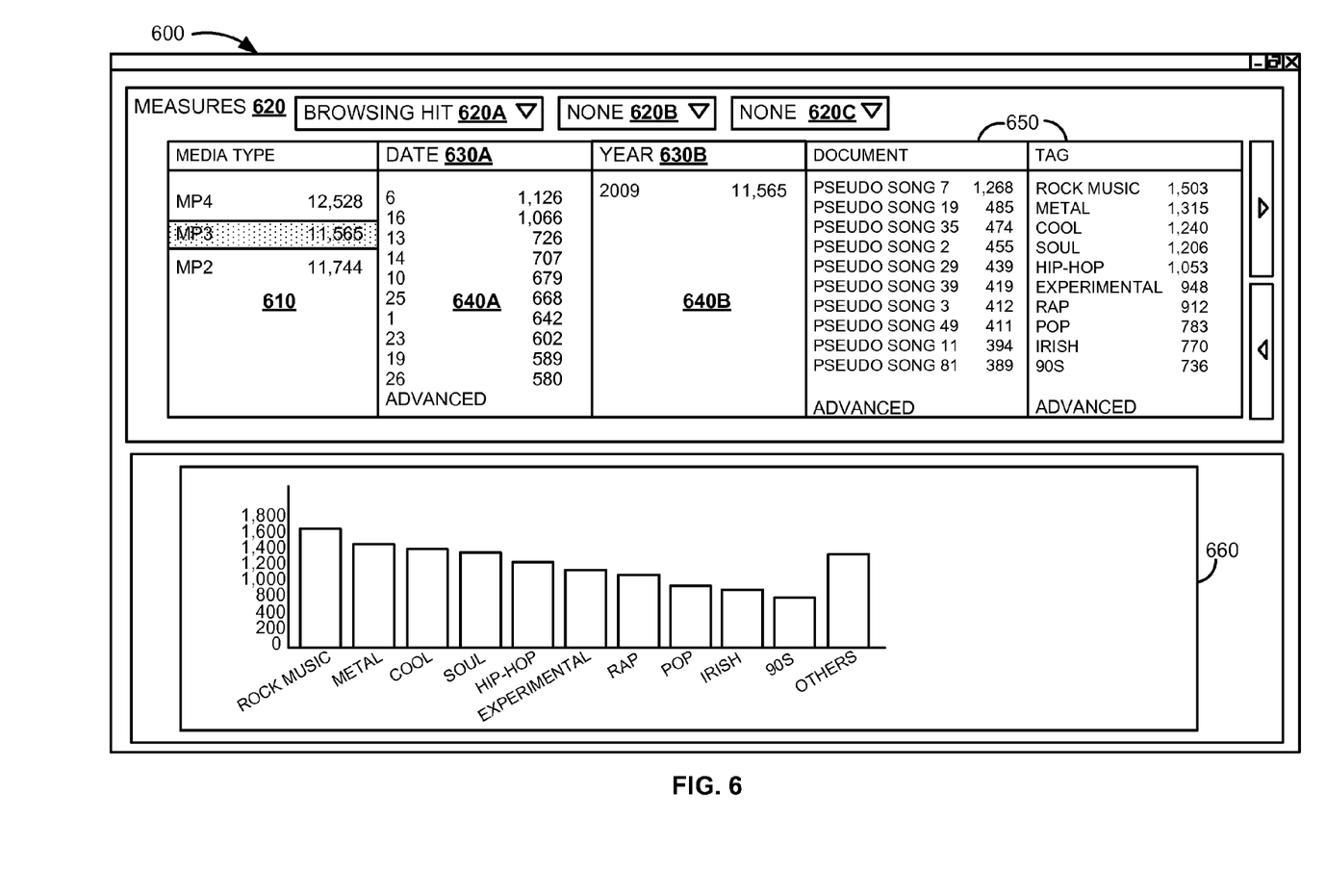
FIG. 6 is an exemplary graphical user interface (GUI) displaying meta-tags of the web content associated with the identified multidimensional tags of step 320 of FIG. 3, according to an embodiment.

FIG. 6 is an exemplary graphical user interface (GUI) 600 displaying meta-tags of the web content associated with the identified multidimensional tags of step 320 of FIG. 3, according to an embodiment. In one embodiment, multidimensional tags allow a good leverage of the existing tools such as business intelligence (BI) tools. Therefore, current reports and charting tools can be applied to display analytic results that are provided by the multidimensional tags. The GUI 600 displays the meta-tag of search results as analyzed from one or more multidimensional tags for search query 'music' of media type MP3 610 using the BI tool. Predetermined measures 620 are displayed to a user to select the desired parameters through multiple slide-down menus 620A to 620C, such as browsing hit 620A. Predetermined tag dimensions are displayed to the user, for example, 'time' is displayed on the GUI 600. The predetermined 'time' tag dimension includes date 630A and year 630B as hierarchies.

In one embodiment, the meta-tag associated with the multidimensional tags is displayed corresponding to the predetermined measures and the predetermined tag dimensions. For example, number of browsing hits in a particular day is displayed in 640A and the total number of browsing hits in a year 2009 in 640B. Further, the document name and tags with the number of browsing hits are displayed in 650. In one exemplary embodiment, the search results are displayed in a graphical form in 660. In summary, by selecting the predetermined tag dimensions and the corresponding predetermined measures, the method can be developed to collect the metrics during the system runtime and further, those measurements can be analyzed to provide insights on how web contents are used in the system using the existing tools such as BI tools as shown on the GUI 600.

Few potential use cases are described below to illustrate how multidimensional tagging is applied to the real time applications. In one exemplary application, systems can gradually filter out meta-noises by eliminating the ineffective tags as the systems can identify tags that are not effectively consumed together with their associated web content using the information in the associated multidimensional tag. Thereby, one of the major challenges in the current tagging systems, in which the tags are diluted by lack of control of using terminology, can be addressed. Further, through multidimensional tagging, the systems can identify tags that are used for the same web content but using different forms of words. Therefore, merging those tags to the ones that is most used can also reduce the overall number of tags that mean the same. Therefore, the better quality of tags means better classification and searching can be achieved. Using analytic ability given by multidimensional tags, the system can promote better quality in tagging.

In another exemplary application, the multidimensional tagging helps improve effectiveness of tagging by providing users more effective tags by analyzing how frequently the tag is used in comparison with how frequently tagged contents are consumed. As a result, systems can provide users with effective tags when users are trying to tag the contents that belong to the similar category. For example, if tag 'rock music' is frequently used to identify certain types of music from a group of artists, and those music are popularly consumed in younger user groups, the tag 'rock music' will be promoted to users to tag music that matches the similar user groups and artists. The above analysis will help the systems to discover tags such as 'rock music' with many tag dimensional attributes, e.g. user groups, age group, etc.

In yet another exemplary application, multidimensional tagging helps to develop more effective navigation or visualization tools based on tags. For example, by giving tag dimensions to tag clouds, a multi-level navigation of tag clouds can be easily implemented. This is due to hierarchies that come from tag dimensions. The similar effect to drill-down can be achieved. For example, users can easily navigate through 'time' dimension, such as day, week, month, and year to find in each level, how tag clouds look different.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 7:
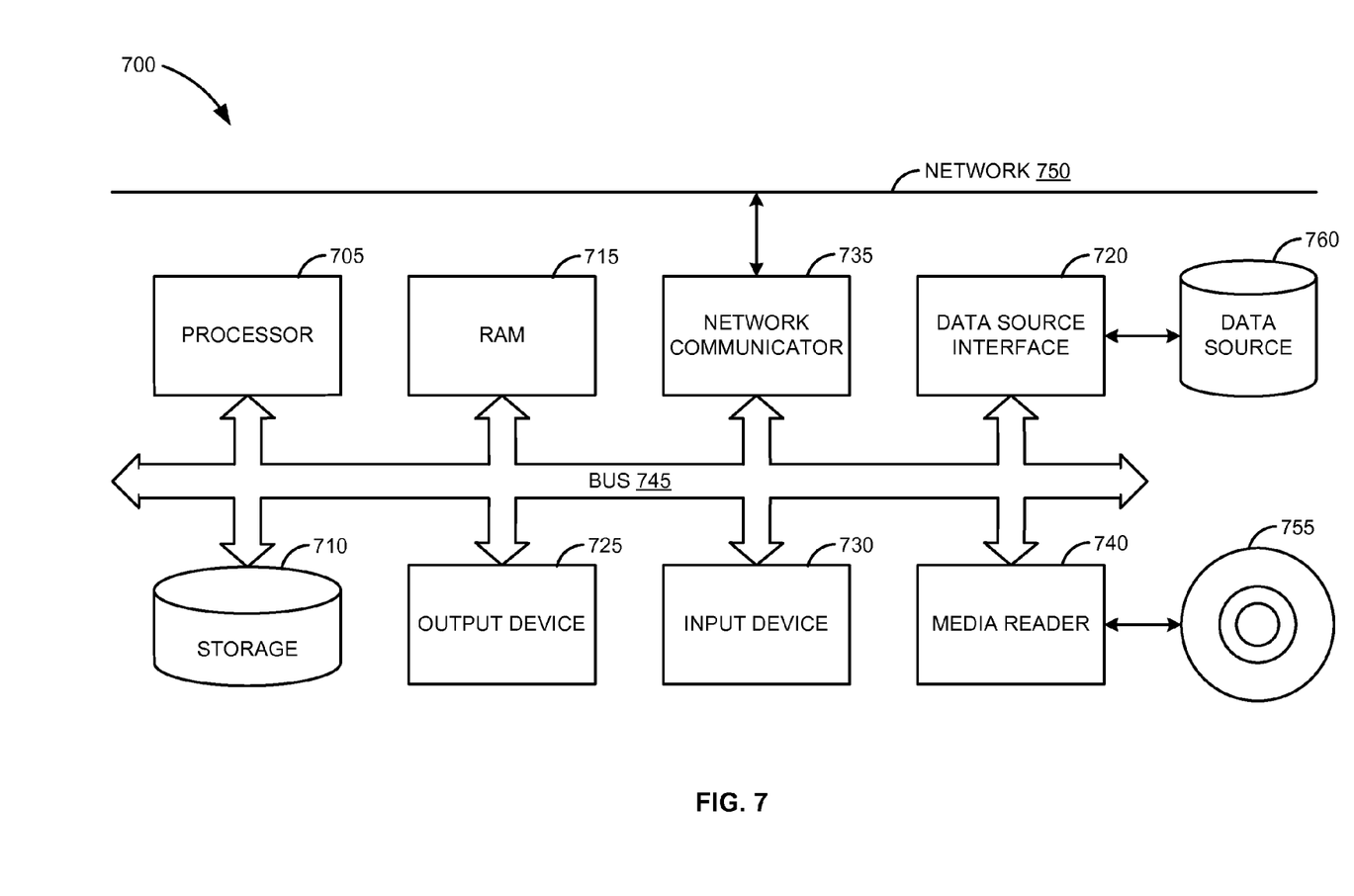
FIG. 7 is a block diagram illustrating a computing environment in which the techniques described for generating multidimensional tags to analyze tagged contents, according to an embodiment.

FIG. 7 is a block diagram of an exemplary computer system 700. The computer system 700 includes a processor 705 that executes software instructions or code stored on a computer readable storage medium 755 to perform the above-illustrated methods of the invention. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment of the invention, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in detail to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:
   define at least one tag core corresponding to web content, wherein the at least one tag core comprises an effective semantic label identifying the web content;
   record a plurality of predetermined tag dimensions and one or more predetermined measures associated with the web content, wherein the plurality of predetermined tag dimensions comprise parameters of metrics describing evolution of the web content and the one or more predetermined measures comprise parameters of metrics describing consumption of the web content;
   assemble the at least one tag core with the corresponding recorded plurality of predetermined tag dimensions and the one or more predetermined measures to generate at least one multidimensional tag; and
   update the at least one multidimensional tag by recording latest at least one predetermined tag dimension and latest predetermined measure when the web content associated with the at least one multidimensional tag is consumed.

2. The article of manufacture of claim 1, wherein updating the at least one multidimensional tag comprises:
   receiving at least one search query corresponding to the at least one multidimensional tag;
   responding to the at least one search query with the web content associated with the at least one multidimensional tag;
   recording the latest at least one predetermined tag dimension and the latest predetermined measure associated with the web content; and
   updating the at least one multidimensional tag with the latest recorded at least one predetermined tag dimension and the corresponding predetermined measure.

3. The article of manufacture of claim 1, wherein the plurality of predetermined tag dimensions comprises parameters selected from the group consisting of time, location, user groups, age groups, format and domain.

4. The article of manufacture of claim 1, wherein the one or more predetermined measures comprises parameters selected from the group consisting traffic, sharing and changing.

5. The article of manufacture of claim 1, wherein the recorded one or more predetermined measures and the associated plurality of predetermined tag dimensions are stored in a tag fact table in a predetermined structured format.

6. A computer implemented method for generating at least one multidimensional tag, the method comprising:

defining at least one tag core corresponding to web content, wherein the at least one tag core comprises an effective semantic label identifying the web content;

a computer, recording a plurality of predetermined tag dimensions and one or more predetermined measures associated with the at least one tag, wherein the plurality of predetermined tag dimensions comprise parameters of metrics describing evolution of the web content and the one or more predetermined measures comprise parameters of metrics describing consumption of the web content;

the computer, assembling the at least one tag core with the corresponding recorded plurality of predetermined tag dimensions and the one or more predetermined measures to generate the at least one multidimensional tag; and updating the at least one multidimensional tag by recording latest at least one predetermined tag dimension and latest predetermined measure when the web content associated with the at least one multidimensional tag is consumed.

7. The computer implemented method of claim 6, wherein updating the at least one multidimensional tag comprises:

receiving at least one search query corresponding to the at least one multidimensional tag;

responding to the at least one search query with the web content associated with the at least one multidimensional tag;

recording the latest at least one predetermined tag dimension and the corresponding predetermined measure associated with the web content; and updating the at least one multidimensional tag with the latest recorded at least one predetermined tag dimension and the latest predetermined measure.

8. The computer implemented method of claim 6, wherein the plurality of predetermined tag dimensions comprises parameters selected from the group consisting of time, location, user groups, age groups, format and domain.

9. The computer implemented method of claim 6, wherein the one or more predetermined measures comprises parameters selected from the group consisting traffic, sharing and changing.

10. The computerized method of claim 6, wherein the recorded one or more predetermined measures and the associated plurality of predetermined tag dimensions are stored in a tag fact table in a predetermined structured format.

11. A computer system for generating at least one multidimensional tag to analyze tagged content, the computer system comprising:

at least one processor; and one or more memory devices communicative with the at least one processor, wherein the one or more memory devices store instructions to:

define at least one tag core corresponding to web content, wherein the at least one tag core comprises an effective semantic label identifying the web content;

record a plurality of predetermined tag dimensions and one or more predetermined measures associated with the web content, wherein the plurality of predetermined tag dimensions comprise parameters of metrics describing evolution of the web content and the one or more predetermined measures comprise parameters of metrics describing consumption of the web content;

assemble the at least one tag core with the corresponding recorded plurality of predetermined tag dimensions and the one or more predetermined measures to generate at least one multidimensional tag; and update the at least one multidimensional tag by recording latest at least one predetermined tag dimension and latest predetermined measure when the web content associated with the at least one multidimensional tag is consumed.

12. The computerized system of claim 11, wherein updating the at least one multidimensional tag comprises:

receiving at least one search query;

responding to the at least one search query with the web content associated with the at least one multidimensional tag;

recording the latest at least one predetermined tag dimension and the corresponding predetermined measure associated with the displayed web content; and updating the at least one multidimensional tag with the latest recorded at least one predetermined tag dimension and the latest predetermined measure.

13. The computerized system of claim 11, wherein the recorded plurality of predetermined tag dimensions and the one or more predetermined measures are stored in a tag fact table in a predetermined structured format.

14. The computerized system of claim 13, wherein the computerized system for recording the one or more measures comprises:

a measure collector;

a measure trigger to trigger the measure collector to record the one or more measures when the web content gets altered; and a measurement provider to quantify metrics of the measures as recorded by the measure collector.

* * * * *